Aug. 30, 1960     B. M. SILVERBERG ET AL     2,950,938
COUPLING FOR POWER TAKE-OFF SHAFT
Filed Aug. 8, 1956
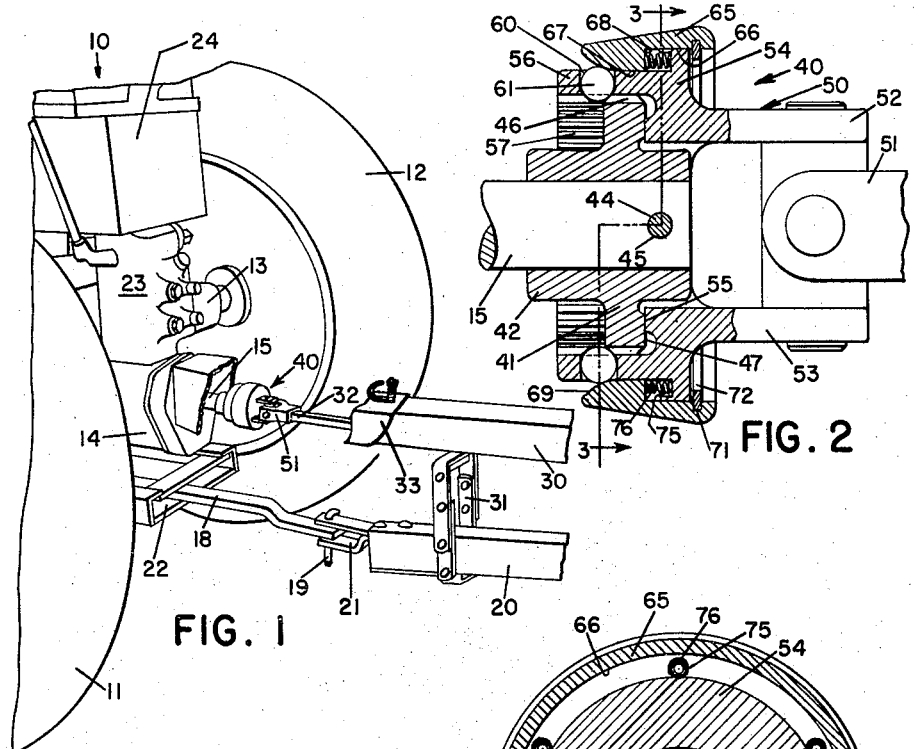
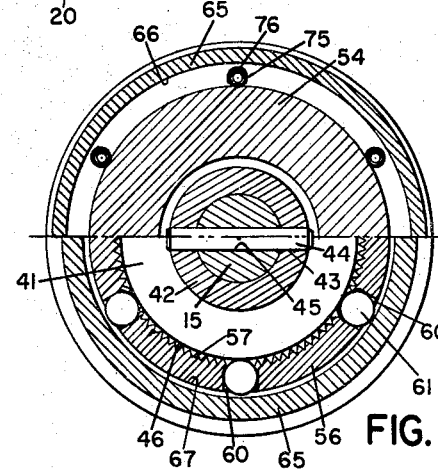
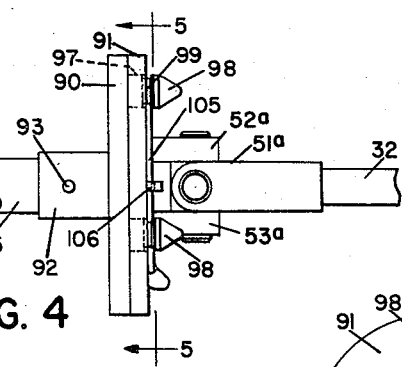
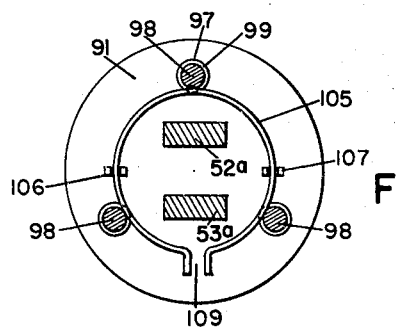
INVENTORS
B. M. SILVERBERG &
F. D. JONES
BY
ATTORNEYS

United States Patent Office 2,950,938
Patented Aug. 30, 1960

2,950,938

COUPLING FOR POWER TAKE-OFF SHAFT

Bernard M. Silverberg, Rock Island, and Frank D. Jones, Moline, Ill., assignors, by mesne assignments, to Deere & Company, a corporation of Delaware Filed Aug. 8, 1956, Ser. No. 602,881

1 Claim. (Cl. 287—130)

This invention relates to a coupling mechanism and more particularly to a coupling mechanism for use with a power take-off shaft of a tractor and a drive shaft of a trail-behind implement.

In recent years there has been a great deal of work done in providing simple connections between tractors and the associated trail-behind implements, the over-all purpose being to provide connections which may be easily attached or detached from the implement or the tractor. With the advent of the power lift system on the tractor the more recent trend is to provide connections between the tractor and implement which may be operated without the operator leaving his station on the tractor and in many instances by use only of the power of the tractor. Most of this latter trend however, pertains to the connections between the drawbar or draft link members of the tractor and the associated tongue or draft connections on the implement. In a considerable number of the implements a driving mechanism is provided in the implement to operate various parts on the implement itself. The drive source for the drive mechanism normally comes from the power take-off shaft also provided on the tractor. It would logically follow that it would be desirable to provide a quick attach and detach coupling between the power take-off shaft and the drive shaft on the implement to operate in conjunction with the simple draft connections between the tractor and implement.

It is therefore the primary object of this invention to provide a coupling on the power take-off shaft which may be easily and simply detached from the power take-off shaft.

It is also an object of this invention to provide in the above type of coupling means for detaching it from the power take-off shaft which requires no tools and very little effort on the part of the operator.

It is still a further object of the invention to incorporate in the above type of coupling biasing means which will normally operate to lock the coupling on the shafts but which may by a small effort, sufficient to overcome the biasing force, unlock the coupling from the shaft.

Other objects and advantages of the invention will become apparent to those skilled in the art as the nature of the invention is more completely understood from the following detailed description and as shown in the accompanying drawings.

Fig. 1 is a perspective view of a rear portion of a tractor and a forward portion of a trail-behind implement and showing the quick-tatch coupling of the present invention. For purposes of illustration portions of the safety shielding overlying the power take-off shaft and implement drive shaft have been removed.

Fig. 2 is an enlarged vertical sectional view of the coupling and power take-off shaft.

Fig. 3 is a sectional view taken along the line 3—3 of Fig. 2.

Fig. 4 is a side view of a modification of the invention.

Fig. 5 is a sectional view taken along the lines 5—5 of Fig. 4.

A tractor 10 is of a conventional type having transversely spaced apart rear wheels 11 and 12 interconnected by suitable axle structures, as at 13. Provided on the tractor is a differential or gear transmission, indicated in its entirety by its housing 14, which operates to drive a power take-off shaft 15. Beneath the power take-off shaft is a tractor drawbar 18 which extends rearwardly from the tractor frame and is connected at its rear terminal end by means of a drop pin 19 to the forward end of an implement tongue 20. A clevis type connection 21 is provided at the forward end of the tongue 20 to receive the drop pin 19. Positioning guides or a stationary drawbar 22 is also provided on the tractor. Other features of the tractor such as the hydraulic unit, indicated in its entirety by the reference numeral 23, and the seat structure 24 are of conventional design.

The trail-behind implement, while not shown, is of the type requiring a drawbar type of connection for pulling the implement in trail-behind fashion and of a type having operating mechanism which receives its power source from the power take-off shaft 15 of the tractor. There are several types of implements which fall in this category such as for example corn pickers, hay balers, manure spreaders and others. Consequently, since the type of implement is unimportant for purposes of this invention, only the extreme forward end of the implement as represented by the tongue 20 and a power shaft mounted under a housing 30 is shown. The housing 30 is supported on suitable brackets 31 fixed to the tongue 20 and obviously serves as safety shielding as well as housing for the power shaft. The power shaft is connected to the power take-off shaft 15 by means of a drive shaft 32 which has its rear end connected to the power shaft by means of a conventional type universal joint, not shown, but positioned under a conventional safety shielding 33 just forward of the housing 30. The forward end of the driveshaft 32 is connected to the power take-off shaft 15 by means of the snap-on type coupling 40 which is the subject matter of the present invention.

It should here be noted that the implement is shown as being connected to the tractor by a clevis type connection at 19 and 21. This simplified type of connection is shown for purposes of illustration only and it should be recognized that other types of draft connections would operate efficiently with this type of coupling. As a matter of fact, it is possible that this type of coupling would receive its greatest acceptance in conjunction with those type of implements which are adapted to be mounted on the tractor or by means commonly known in the trade as the standard "three point" type of hitch.

The coupling 40 is composed of a radially extending member 41 mounted on the power take-off shaft 15. The member 41 has a hub 42 apertured as at 43 to receive a pin 44 which extends through the aperture 43 and a corresponding registrable aperture 45 in the power take-off shaft. The radial member 41 has a radially extending plate or flange portion with its outer peripheral edge having a toothed section as at 46. Also included in the coupling mechanism is a corresponding or second radial member indicated in its entirety by the reference numeral 50 which is fixed to the drive shaft 32 by means of a universal type joint 51, part of which includes bifurcated leg portions 52, 53 integral with the radial member 50. The member 50 is further characterized by having a radially extending plate or annular portion 54 having a forward surface 55 lying normally adjacent to the rear plate surface 47 of the radial member 41, and an axially extending flange 56 extending forwardly and overlying the outer periphery of the radial member 41. The flange 56 has an internal toothed surface 57 which receives the teeth of the radial member 41. When in mesh the toothed surfaces 46 and 57 will cause the radial members 41 and 50 to rotate in unison. Also, this permits, unless otherwise restricted, the radial member 41 to move axially relative to the radial member 50.

A plurality of angularly spaced apertures 60 are provided in the flange 56 to receive ball or locking elements 61 and to permit the balls to move radially. The balls 61 are characterized by having a substantially larger diameter than the thickness of the flange 56 so that a portion of the ball will extend radially inwardly or outwardly of the flange.

Associated with the member 50 is an annular ring 65 which is axially slidably mounted on the member 50. The ring 65 has an internal surface 66 which normally rides adjacent to the peripheral edge of the annular portion 54 and an internal surface 67 which normally rides adjacent to the outer periphery of the flange portion 56, the ring being suitably stepped radially inwardly as at 68 to provide a radial surface between the cylindrical surfaces 66, 67. The forward end of the annular ring 65 is provided with an internal cam surface 69 which engages the locking or ball elements 61. The annular ring 65 is restricted in its axial movement in the first instance by the radial surface 68 which acts as a stop in one direction and in the second instance by a snap ring 72 which is seated in a suitable slot 71 in the ring 65, the ring 72 acting as a stop in the opposite direction. A plurality of angularly spaced indentations 75 are provided in the forward portion of the annular member 54 for receiving compression springs 76. The other end of each spring 76 is seated in the indentation 75 and the other end of which projects from the face of the annular member to engage the radial surface 68 of the annular member 65.

The coupling operates in the following manner. To engage the coupling, to cause the power take-off shaft 15 and the drive shaft 32 to rotate in unison, the annular ring 65 is first drawn manually rearwardly to compress the springs 76. This permits the balls 61 to move outwardly against the cam surface 69 to remove them as obstructions against sliding the member 50 over the outer toothed surface 46 of the member 41. Upon the radial surface 55 engaging the surface 47 of the plate 41, the ring 65 may be released to cause the cam surface 69 to drive the balls or locking elements 61 radially inwardly and forwardly of the radial member 41, thereby locking the coupling elements against disengagement. To uncouple the drive shaft from the power take-off shaft the annular ring is drawn rearwardly to compress the springs thereby permitting the balls or locking elements to move radially outwardly and to clear the external edge of the teeth 46 so as to permit the member 50 to slide off of the member 41. It would be noted that the teeth 46 have a bevel which operates as a cam to move the locking members 61 outwardly. It should also be noted that under no circumstances will the ring 65 be moved to a position rearwardly which will permit the locking elements 61 to be released externally from the apertures 60, nor can the locking elements 61 escape from the apertures internally, the balls being limited in their radial inward movement by the shape of the apertures 60 which causes them to seat at maximum inward position. Therefore, while the coupling may be coupled or uncoupled relatively easily, the only manner in which the parts of the coupling may be disassembled is by first removing the snap ring 72 to permit the annular ring 65 to be slid forwardly and off of the member 50.

In the modified form of the invention as shown in Figs. 4 and 5, the coupling is characterized by having a pair of radial plate members 90, 91 having adjacent surfaces, the plate 90 being fixed to the power take-off shaft 15 by means of an integral hub 92 and a pin 93 which extends through the hub and the power take-off shaft, and the plate 91 being fixed to the drive shaft 32 by means of a universal type joint 51a part of which includes lugs 52a, 53a which extend rearwardly and are integral with the plate 91. The shaft 32 is so mounted in its supporting structure to permit movement of the shaft 32, and the associated plate 91 relative to the axis of the shaft. The plate 91 is provided with a plurality of axial openings 97 for receiving axial projected pins 98 which are fixed to the plate member 90 in any suitable manner. The pins are characterized by having conical ends which permit ready alinement and movement through the openings 97.

A snap ring 105 is mounted adjacent to the rear surface of the plate 91 by means of apertured lugs 106, 107 which are fixed to that surface and project rearwardly. The ring 105 is separated as at 109 and is normally biased to seat itself in the peripheral slots 99 in the pins 98. Viewing Figs. 4 and 5, it becomes apparent that when the ring is seated in the slots that the plates 90, 91 are prevented from separating.

In operation the latter form of the invention couples and uncouples in the following manner. To couple the power take-off shaft 15 to the drive shaft 32 the plates 90 and 91 are first caused to lie adjacent to one another and the pins 98 to extend through the corresponding openings 97. When the pins are moved axially through the plate 91 the outer point of the conical end will engage the edge of the ring 105 to cause it to compress or distort as the pins 98 continue through the plate 91. Upon the plate 90 reaching a position in which its surface is adjacent to the plate 91 the snap ring 105 will automatically expand and seat itself in the slots 99 thereby locking the plates 90, 91 against separation. To uncouple the coupling manual closing of the gap 109 of the snap ring 105 will cause the outer edge of the snap ring to clear the slots 99 in the locking elements or pins 98 to thereby permit the plates 90 and 91 to be separated.

What is claimed is:

A coupling for connecting a pair of shafts comprising: a first coupler element fixed to one of said shafts having a radial surface facing the direction of the other shaft; a second coupler element mounted on said other shaft having opposite disposed radial surfaces, one of which lies adjacent the radial surface of the first element; a plurality of pins extending from the radial surface of the first member, each having a peripheral groove and a tapered end beyond said groove; a plurality of axial openings in the second coupler element accommodating the pins for axial movement; a snap ring mounted on the second element and fixed against axial movement to said second element, said snap ring normally positioned to at least partially cover the openings, said snap ring being disposed whereby upon axial movement of the pins through the openings to first contact the tapered ends of the pins to effect distortion of the ring for uncovering said openings and to automatically seat itself in said grooves upon the latter moving into alinement with the ring; and means for effecting disengagement of said ring from said grooves.

(References on following page)

References Cited in the file of this patent

UNITED STATES PATENTS

| | | |
|---|---|---|
| 1,085,041 | Haughey | Jan. 20, 1914 |
| 1,397,101 | Kelly | Nov. 15, 1921 |
| 1,622,064 | Sullins | Mar. 22, 1927 |
| 1,895,992 | Hepburn | Jan. 31, 1933 |
| 2,448,278 | Ronning | Aug. 31, 1948 |
| 2,680,636 | Griffin | June 8, 1954 |
| 2,738,210 | Hjembo | Mar. 13, 1956 |

FOREIGN PATENTS

| | | |
|---|---|---|
| 5,084 | Great Britain | Oct. 25, 1883 |
| 155,065 | Sweden | June 26, 1956 |
| 349,329 | Great Britain | May 28, 1931 |
| 677,806 | Great Britain | Aug. 20, 1952 |